US006615196B1

(12) United States Patent
Kampert et al.

(10) Patent No.: US 6,615,196 B1
(45) Date of Patent: Sep. 2, 2003

(54) METHOD FOR DATA INPUT INTO A POSTAGE COMPUTER AND ARRANGEMENT FOR THE IMPLEMENTATION OF THE METHOD

(75) Inventors: Werner Kampert, Hamburg (DE); Frank Reisinger, Oranienburg (DE)

(73) Assignee: Francotyp-Postalia AG & Co. KG, Birkenwerder (DE)

(*) Notice: Subject to any disclaimer, the term of this patent is extended or adjusted under 35 U.S.C. 154(b) by 0 days.

(21) Appl. No.: 09/388,626

(22) Filed: Sep. 2, 1999

(30) Foreign Application Priority Data

Sep. 11, 1998 (DE) ........................................ 198 43 252

(51) Int. Cl.[7] ................................................ G06F 17/00
(52) U.S. Cl. ........................................................ 705/410
(58) Field of Search .................................. 705/410, 409

(56) References Cited

U.S. PATENT DOCUMENTS

| | | | | |
|---|---|---|---|---|
| 4,138,735 A | 2/1979 | Allocca et al. | ............. | 705/409 |
| 4,649,489 A | 3/1987 | Denzin | ....................... | 705/410 |
| 5,448,641 A | 9/1995 | Pintsov et al. | ................ | 380/51 |
| 5,490,077 A | 2/1996 | Freytag | ...................... | 705/405 |
| 5,606,508 A | 2/1997 | Thiel | .......................... | 705/410 |
| 5,710,706 A | 1/1998 | Märkl et al. | ................ | 705/409 |
| 6,153,835 A | * 11/2000 | Schwartz et al. | ........... | 705/407 |

FOREIGN PATENT DOCUMENTS

| | | |
|---|---|---|
| DE | 38 23 719 | 1/1989 |
| EP | 0 373 971 | 6/1990 |
| EP | 0 717 376 | 6/1996 |
| WO | WO 98/57305 | * 12/1998 |

OTHER PUBLICATIONS

No author; Pitney Bowes introduces PostPerfect; Sep. 12, 1995; Business Wire; dialog copy pp. 1–3.*

* cited by examiner

*Primary Examiner*—Thomas A. Dixon
(74) *Attorney, Agent, or Firm*—Schiff Hardin & Waite

(57) ABSTRACT

In a method and apparatus for data input into a postage computer loading and updating of rate table data in the postage computer, take place with two operations being separated from one another in time. The transmission and storage of a new postage fee schedule table in a postage computer can be implemented on demand or automatically pre-programmed at a first point in time. The actual updating of rate table data is automatically implemented at a second point in time. The method and apparatus are suitable for postage meter machines as well as for scales containing postage computers or similar devices. The apparatus contains a postage computer and a memory for service data with memory areas for data related to rate tables. The postage computer is programmed for detecting the input and for storing a load requirement, for checking the load requirement and for loading given the presence of the load requirement, for input of a conversion requirement during loading, as well as for checking the conversion requirement and conversion to the current, new rate table or transition into the operating mode.

15 Claims, 3 Drawing Sheets

METHOD FOR DATA INPUT INTO A POSTAGE COMPUTER AND ARRANGEMENT FOR THE IMPLEMENTATION OF THE METHOD

BACKGROUND OF THE INVENTION

1. Field of the Invention

The present invention is directed to a method and apparatus for data input into a postage computer of the type suitable for the conversion of a current postage fee schedule to a new postage fee schedule table in the postage computer, both for postage meter machines and for scales containing postage computers, or similar devices containing postage computers.

2. Description of the Prior Art

German PS 38 23 719 and U.S. Pat. No. 4,138,735 disclose reloading a fee schedule table for postage fees initiated by a remote data center at specific points in time. When the data exchange is initiated by the server of the data center, the postage meter machine must remain constantly connected which is disadvantageous.

U.S. Pat. No. 5,490,077 and U.S. Pat. No. 5,606,508 disclose proposed initiating the data loading from the postage meter machine on demand, whereby the data base is updated after the activation of the postage meter machine dependent on conditions (such as, for example, name, date). In order to equip the majority of postal customers with a fee schedule table in advance of its effective date, this fee schedule is stored in a memory of a transmission means (chip card or cell of a GSM network) separate from the postage meter machine long before it takes effect. When the postage meter machine is turned on, the date of the calendar module of the postage meter machine is employed, or is operated on with further conditions that are entered, in order to select the table, and the table is thereupon loaded into the memory of the postage meter machine when the machine is placed into operation. An updating of the previous table ensues when loading from a memory of the transmission medium into the memory of the postage meter machine.

U.S. Pat. No. 5,710,706 corresponding to European Application 724 141 discloses a scale that is connected by an interface to a postage meter machine in order to update fee schedule table data. The loading of the update data ensues from a remote data center by modem to the postage meter machine. The loading and updating ensue in immediate succession. When a message is present that fee schedule table data are to be updated, a loading ensues. The update data or new fee schedule can be intermediately stored in the postage meter machine and a sector-by-sector deletion of the old postage fee schedule table in the non-volatile memory of the scale can take place before the transfer of the new fee schedule table data from the intermediate memory of the postage meter machine to the scale, and the write-in of the new fee schedule table data in the non-volatile memory of the scale. A number of tables can be stored in the scale, however, each table refers to a separate mail carrier that can be selected via keyboard. The minimum validity date of a fee schedule table allocated to a carrier identification number CIN is stored and is interpreted by the postage meter machine in order, as needed, to form request data, to load new fee schedule table data, or to update the data in the memory of the scale according to the CIN. If, however, the minimum validity date is also the conversion date from an old to a new fee schedule table, then a backlog of communications ensues at the data center when multiple postage meter machines wish to communicate with this data center on the same day.

U.S. Pat. No. 5,448,641 discloses a postal fee system wherein a validity check is made in the terminal equipment at the user side. The postage fee schedule table is transmitted from the data center to the terminal equipment. A code belonging to the postage fee schedule table is also transmitted from the data center to the terminal equipment. The terminal equipment generates a comparison code from a message based on the received postage fee schedule table. On the basis of the comparison of the received code to the generated comparison code, the validity of the received postage fee schedule table can be checked in the terminal equipment. The terminal equipment thus can verify the communicated postage fee schedule table. For reducing the communication backlog with the data center, when multiple postage meter machines wish to communicate with this data center on the same day, a very high number of modems would have to be utilized, thereby increasing the outlay at the data center. Communication problems also occur due to the backlog, which lead to a lengthening of the conversion process to the new postage fee schedule table for a number of devices. During this time, the users cannot operate the affected devices for mail processing.

SUMMARY OF THE INVENTION

An object of the present invention is to provide a method and apparatus for data input into a postage computer wherein the conversion event to a new postage fee schedule table is shortened without thereby increasing the outlay in the data center.

A further object is to provide such a method and apparatus which allow a postage fee schedule table to be communicated to terminal equipment on demand in order to be able to load this into corresponding memories of the postage computer without the loading having to be preceded by a shutoff of the machine.

The above objects are achieved in an inventive method and apparatus for data input into a postage computer which allow a loading and updating of postage fee schedule table data in the postage computer, with transmission and storage of a new postage fee schedule table in a postage computer being implemented on demand arbitrarily during the operation of the postage computer or can be automatically implemented pre-programmed at a first point in time. After the user-defined loading, the updating of postage fee schedule table data is automatically implemented at a second point in time defined by the carrier. The postage computer can be arranged in one of the devices of a mail processing system. A trigger key for loading is preferably arranged in the same device that contains the postage computer. The device with the postage computer preferably contains a memory for storing rate tables.

Inventively, the memory of the postage computer can store at least two tables for the same mail carrier. One of the two tables is the table which will be valid in the future, the loading of which was initiated early by the actuation of a trigger key subject to a fee. The mail carrier is the appertaining postal authority or a private carrier that sends a communication to the user of the mail processing system informing the user of an impending effective date of a new fee schedule. There is usually still enough time before conversion to the new table from the date on which the user receives, for example, a letter with the information delivered by the mail carrier. If all users were to attempt at the same point in time to load the data from the server of a data center, the data center would become temporarily unreachable for some of these users. Even if the data processing capacity of the server were extremely high, so that data could be loaded significantly faster and even if simultaneous communication were possible with a number of subscriber terminals or modems, the problem could only be alleviated but not eliminated. Inventively, the procedures of loading and updating are separated from one another in time, so that a relatively large time span is available for loading.

The fact that the data are already loaded before the date of conversion enables the telephone charges to be advantageously reduced. Since the updating does not ensue during a communication with the server but independently thereof, the updating can be simultaneously implemented in all systems (users) once these systems have loaded the data in one of their memories in advance and stored the data in non-volatile fashion. This solution requires only slightly more memory space, which is becoming increasingly less expensive, and thus minimizes not only the conversion time but also the number of modems that are required and that must be connected to the server.

The executive sequences with which an updating of data are triggered sequence automatically. A memory location is reserved for this purpose in that device of the system that is intended to store the date when the table takes effect, i.e., a conversion date.

The memory location must be interrogated under specific conditions. The same device of the system that implements this interrogation also undertakes the check to determine whether the conversion time has been reached.

The invention is based on the need of some mail carriers to arbitrarily change the service data, particularly the fees in postage rate tables. The service data are required in a processing module in or at the terminal equipment. The service data particularly include the fees in postage fee schedule tables, but are not limited thereto. For simplicity and to avoid repetition only postage fee schedule tables are mentioned below, but other types of service data are not excluded.

Advantageously, thus, the communication from the data center by modem can ensue directly with the processing module in the terminal equipment or indirectly with the processing module via the terminal equipment.

The processing module is an electronic postage computer. The postage computer can be integrated in the terminal equipment or can be arranged separately from the terminal equipment. The terminal equipment is preferably an electronic postage meter machine or a postage calculating scale. The terminal equipment is connected to or contains the postage computer and the microprocessor of the terminal equipment or of the postage computer is programmed to undertake storage of the new postage fee schedule table data in the memor of the terminal equipment or in the memory of the postage computer.

DESCRIPTION OF THE PREFERRED EMBODIMENTS

Figure 1A:
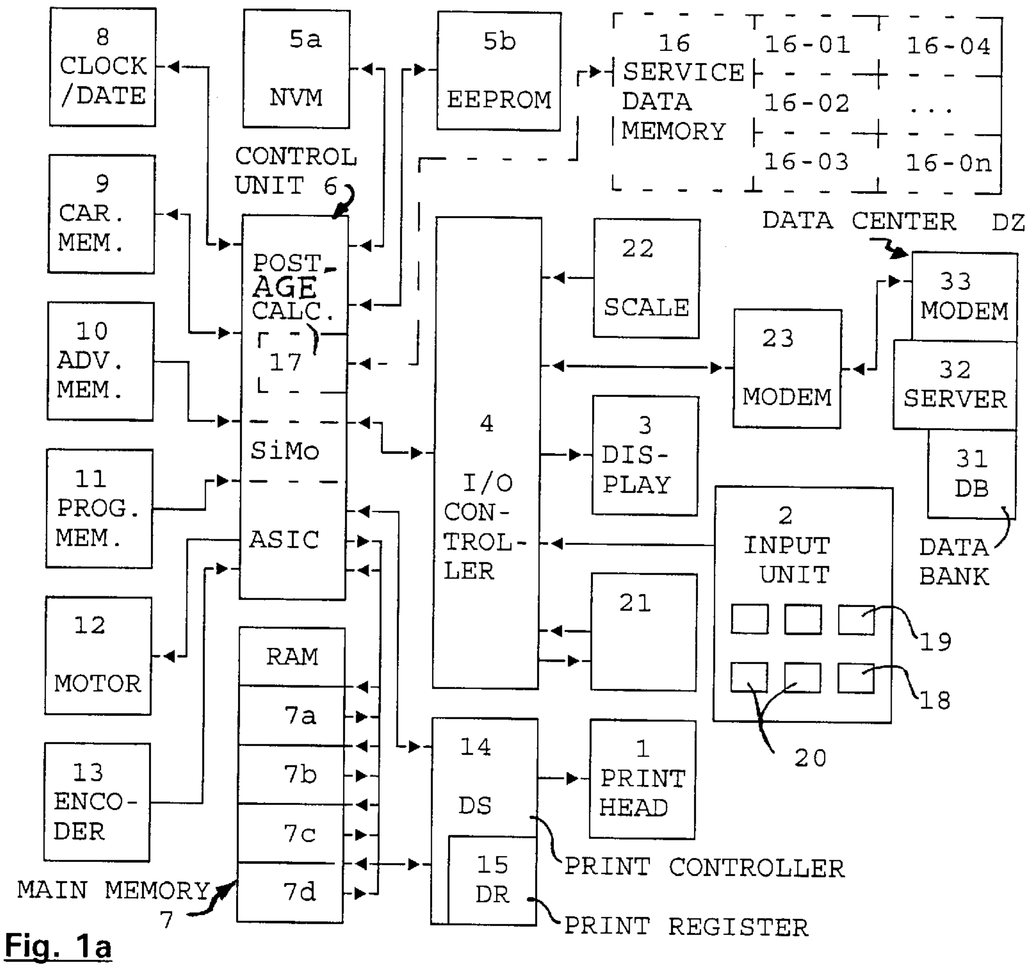
FIG. 1*a* block circuit diagram of a postage meter machine with an internal postage computer and a postage fee schedule table memory the postage computer being programmable and operable in accordance with the invention.

FIG. 1*a* shows a block circuit diagram of the inventive postage meter machine with a printer module 1 for a fully electronically generated franking image, with at least one input unit 2 having a number of actuation elements (such as a keyboard), a display unit 3, a modem 23 producing communication with a data center. A further input unit 21 or a scale 22 are coupled to a control unit 6 via an input/output control module 4. The postage meter machine contains non-volatile memories 5*a*, 5*b*, 9, 10 and 11 (the contents of which are described below), which include the variable and constant parts of the franking format, and/or programs for processing the data in conjunction with the mail carrier or service that the carrier is to provide. In addition to a microprocessor μP, the control unit 6 in further embodiments can also contain a separate postage calculator 17 and further components such as an application-specific integrated circuit ASIC for communication with sensors and actuators of the machine base (see European Application 716 398), a security module SiMo (see European Application 789 333) and other means for improving the data security (see German OS 196 50 993).

Newer postage meter machines utilize a digitally operating printer module 1. For example, thermal transfer printers or ink jet printers were utilized for the first time world-wide in the postage meter machine models T1000 and JetMail of Francotyp-Postalia AG & Co. It is thus possible to print other information or to print these information differently as desired on a filled envelope in the area of the franking imprint, this information having a corresponding relationship to a service of a carrier. It is thus also easily possible to change among private mail carriers and their services. The franking imprint therefore advantageously contains a reference to the carrier and/or the service being used or being planned. The character memory 9 supplies the necessary print data for the variable parts of the franking format to a volatile main memory (RAM) 7. The microprocessor μP of the control unit 6 is in communication with the input/output control module 4, with the character memory 9, with the volatile main memory 7 and with non-volatile main memories 5*a*, 5*b* (which contains internal, non-volatile fee schedule memories) or (shown with broken lines) with an additional non-volatile fee schedule memory 16. The microprocessor μP also communicates with a non-volatile main memory 10 and program memory 11, with the motor of a transport or feeder means, which may include a tape dispenser 12 and an encoder (coding disk) 13, as well as with a battery-supported calendar module (clock/date module 8). That memory module that forms the non-volatile main memor, 5*b* can, for example, be an EEPROM that is protected from removal by at least one additional measure, for example by being glued onto the printed circuit board, by being sealed or cast with epoxy resin. Further details regarding individual functions of the security means are provided in German OS 195 34 530.

For example, the storage of the postage fee schedule tables can be realized within the non-volatile memory 5*a* in that special memory areas that are provided. The postage fee schedule tables can be separately stored in a non-volatile memory 16 (shown with broken lines). The individual memories can be realized physically separated or—in a way that is not shown—combined in a few modules. The fee schedule table which will be valid in the future is stored in the memory area 16-01 accordingly established therefor and the currently valid fee schedule table is correspondingly stored in the separately provided memory area 16-02. The appertaining conversion date is stored in a third area 16-03 of the non-volatile memory 16. Information in a fourth memory area 16-04 for such new postage fee schedule tables available in the data center is, for example, in the form of a carrier-associated order number or version number. The available memory capacity in the non-volatile memory amounts, for example, to 20 kBytes and is optimally used by a spaces-saving memory management. The non-volatile fee schedule memory is preferably a battery-supported C-MOS-RAM module.

The data center DZ has modems 33 that are connected to a server 32 that accesses a data bank 31 when a corresponding request is received. Given on demand actuation of a key of the input unit 2, or by the operation of some other suitable input unit 21 of the postage meter machine, or time-controlled by the calendar module 8 that forms a trigger circuit, a load instruction is generated that triggers the loading of the fee schedule table data. The microprocessor μP can be programmed so that service data that only constitute parts of a table (patches, are loaded from the data center DZ. The microprocessor μP can then communicate the request data by modem 23 via a communication network to the modem 33 of the data center DZ. Alternatively, transmission/reception devices can be utilized in order to communicate request data by radio, or a digital communication network can be used.

Figure 2:
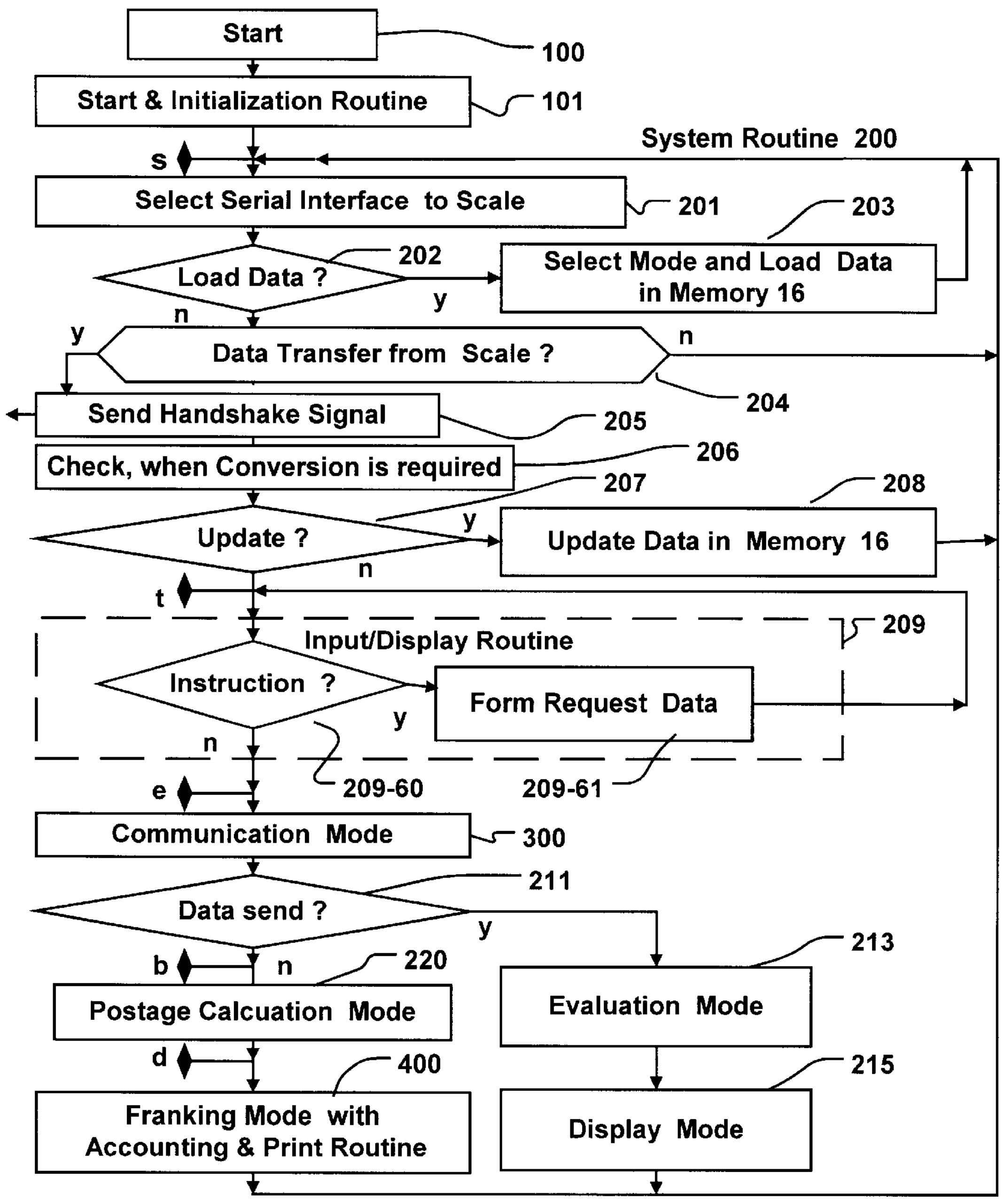
FIG. 2 flowchart showing the operation of a postage meter machine according to FIG. 1*a*.

FIG. 2 shows a flowchart for a postage meter machine according to FIG. 1*a*, whereby a loading for a postage meter machine being operated ensues separately from a conversion. After the postage meter machine is turned on in start step 100 and after executing a start and initialization routine 101, such as disclosed in detail in German OS 195 34 530, the point s of the system routine 200 is reached. The postage meter machine has now been placed in operation and is in its normal operating mode that is also called normal mode. In a first step 201, non-volatilely stored input data are called for setting the postage meter machine. If the postage meter machine was set during the initialization routine 101 to collaborate with an activated scale, then a serial interface to the scale is selected in the first step 201 in order to receive at least one communicated weight value. The input unit 2 allows a number of further inputs for modifying the settings. For example, given actuation of a key 19 of the input unit 2, a load instruction is directly entered. Alternatively, a code can be entered with keys 20, this being acknowledged with a key 18 in order to generate a load instruction later (possibly periodically). The input/display routine 209 contains a number of interrogation steps, only a single-interrogation step 209-60 thereof being shown. This step 209-60 interrogates for the presence of a load instruction. When such an input is recognized, a branch is made to sub-step 209-61 in order to set a communication requirement flag (E-flag), and then to reset the load instruction. If no (renewed) such input was recognized, a branch is made to the point e, possibly via further interrogation steps. In the communication mode 300, a check is made to determine whether an E-flag was set, and if so an automatically sequencing electronic communication with the data center DZ is triggered.

In the communication mode 300, the requesting postage meter machine identifies itself at the data center with its identification number ID and communicates at least the version number of the previous postage fee schedule table for the purpose of locating a new postage fee schedule table in the data bank DB31 of the data center. Each postage fee schedule table has a version number allocated to it that is to be compared to the version number communicated from the requesting postage meter machine in order to identify the new version number of the postage fee schedule table to be loaded in future. The server 32 is programmed for checking the proper transmission and error-free intermediate storage of service data, this being explained in detail in German Application 198 30 055.7, corresponding to co-pending U.S. application Ser. No. 09/340,782 "Method for the Dependable Transmission of Service Data to a Terminal Equipment and Arrangement for Implementing the Method," Reisinger, assigned to the same assignee Francotyp-Postalia AG & Co., as the present application. The postage fee schedule table data are preferably initially intermediately stored in the memory area 7*d* of the volatile main memory 7 of the postage meter machine in order to enable a check.

If service data were communicated and intermediately stored in the main memory area 7*d* as a result of the communication, then this is recognized in the following interrogation step 211 and a branch is made to the evaluation mode 213. It is not only possible in the evaluation mode to check the correctness of the communication and validity of the new service data, but also further checks or statistical acquisitions can be realized. It can be optionally provided to check the updating requirement of service data in the evaluation mode and to update the service data if necessary. The result of this check is displayed in the display mode 215 before a branch is made back to the point s of the system routine. When the result of this check was positive, for example, a U-flag for mode switching is set for a following updating. In the interrogation step 202, a check can be made, for example with reference to the set U-flag, as to whether service data are to be loaded into the non-volatile memory 16. In step 203, a number of sub-steps then ensue for mode switching and for loading the service data into the non-volatile memory 16. The U-flag for mode switching is then in turn reset in a terminating sub-step before a branch is made back to point s of the system routine.

If, however, the result of this check was negative, then a branch is made to the next step, for example to the interrogation step 204. In the interrogation step 204, an inquiry is made as to whether a data transmission ensued from the scale 22. If no weight value from the scale 22 is identified and transmitted to the postage meter machine, then this is determined in interrogation step 204 and a branch is then made back to point s of the system routine 200. The postage meter machine thus waits for an input from the scale 22. When this input ensues, a handshake signal is sent to the scale 22 in the step 205 and a branch is then made to step 206 in order to check whether a conversion is required, particularly on the basis of a stored conversion date and the current date. Given a requirement for a conversion, a branch is made to step 208 in order to implement an updating of the service data in the memory areas of the non-volatile memory 16. A branch is then made back to the point s of the system routine. Otherwise, the point t of the system routine 200 is reached. The input/display routine 209 contains a number of interrogation steps, each thereof being individually interrogated. The aforementioned German OS 195 34 530 discloses further interrogation steps. If no further inputs are present, the step 300 is executed without communication. When no further data were communicated, this being identified via the interrogation step 211, the point b of the system routine 200 is reached.

The aforementioned German OS 195 34 530 discloses a number of steps that can be executed between the points b and d of the system routine 200 before a branch is made to the franking mode 400. In a known way, one of the steps in the present exemplary embodiment is a postage calculating mode 220. The following franking mode 400 contains a known debiting and printing routine. After the printing of a franking imprint, a branch is made back to the point s of the system routine 200.

As the postage computer, the microprocessor μP is programed both for loading and updating fee schedule table data by a program stored in the program memory 11. The program memory 11 is implemented as a read-only memory ROM. The microprocessor μP is programmed for checking the stored conversion date of the postage meter machine on the basis of the current date stored in the clock/date module 8 and for processing using the old (current) postage fee schedule tables when the current date falls short of the conversion date or, otherwise, for communicating an instruction to implement the conversion.

Alternatively, the control unit 6 can contain a separate (dedicated) postage calculator 17 for calculating postage, forming a postage computer together with the memory 16. The microprocessor μP is programmed to check the stored conversion date in the postage meter machine on the basis of the current date. The postage calculator 17 is programmed to continue processing with the old postage fee schedule data when the current date falls short of the conversion date. The microprocessor μP is programmed to communicate an instruction to the postage calculator 17 to update the postage fee schedule table data when the current date is equal to or exceeds the conversion date.

In one embodiment, the postage meter machine is set to a specific town and to a specific loading date upon initialization. These settings can be stored in the non-volatile memory 5*a*, or in the memory 16 in separate memory areas 16-05, 16-06. The loading date stored in the memory area 16-06 is interrogated, for example, in the interrogation step 202 and is separate from the conversion date stored in the memory area 16-03. A pre-programmed loading thus can ensue automatically in the operating mode of the postage meter machine at a first point in time in the loading mode, and the actual conversion of service data automatically ensues at a second point in time. Assuming the postage meter machine is not previously shut off, service data are loaded into the first memory area 16-01 provided for the loading at the pre-programmed, first point in time, for example after midnight, when telephone rates are lower. The second point in time for the conversion is prescribed by the mail carrier and is loaded into the third memory area 16-03 during loading. When the current date is equal to or exceeds the conversion date, the postage computer is programmed to update the rate table data. The postage computer thereby implements an erase and write-in of data into the second memory area 16-02 during the updating of the postage fee table data. The invention thus includes the steps:

a) providing memory areas for data related to rate tables in a memory 16 for service data, including a fifth memory area 16-05 at least for storing a first set of information composed of a number of city names or for storing a comparable first set of information that identifies the desired city names; and b) programming the postage computer:

for initializing a system including the postage computer after turn-on in a start and initialization routine 101, whereby the initialization is undertaken corresponding to the input of at least one city name or a comparable, first set of information that identifies the city names;

for detecting the input and storage of a load requirement, including the loading date stored in the sixth memory area 16-06, and/or of a comparable, second set of information stored in the fourth memory area 16-04 that identifies a pre-selection of a rate table for a predetermined carrier for the postage computer;

for checking the load requirement in step 202 or the loading date on the basis of the date offered by a calendar module and for loading, beginning with a mode switching to a loading mode, when a date offered by the calendar module reaches the stored loading date or exceeds it, and transition into the operating mode when the offered date falls short of the stored loading date;

for entering a conversion requirement when loading, particularly storing a conversion date in the memory area 16-03; and for checking the conversion requirement in step 206 on the basis of the conversion date compared to the date provided by the clock/date module 8 and setting to the current, new rate table when the provided date reaches the stored conversion date or exceeds it, or transition into the operating mode when the offered date falls short of the stored conversion date.

Figure 1B:
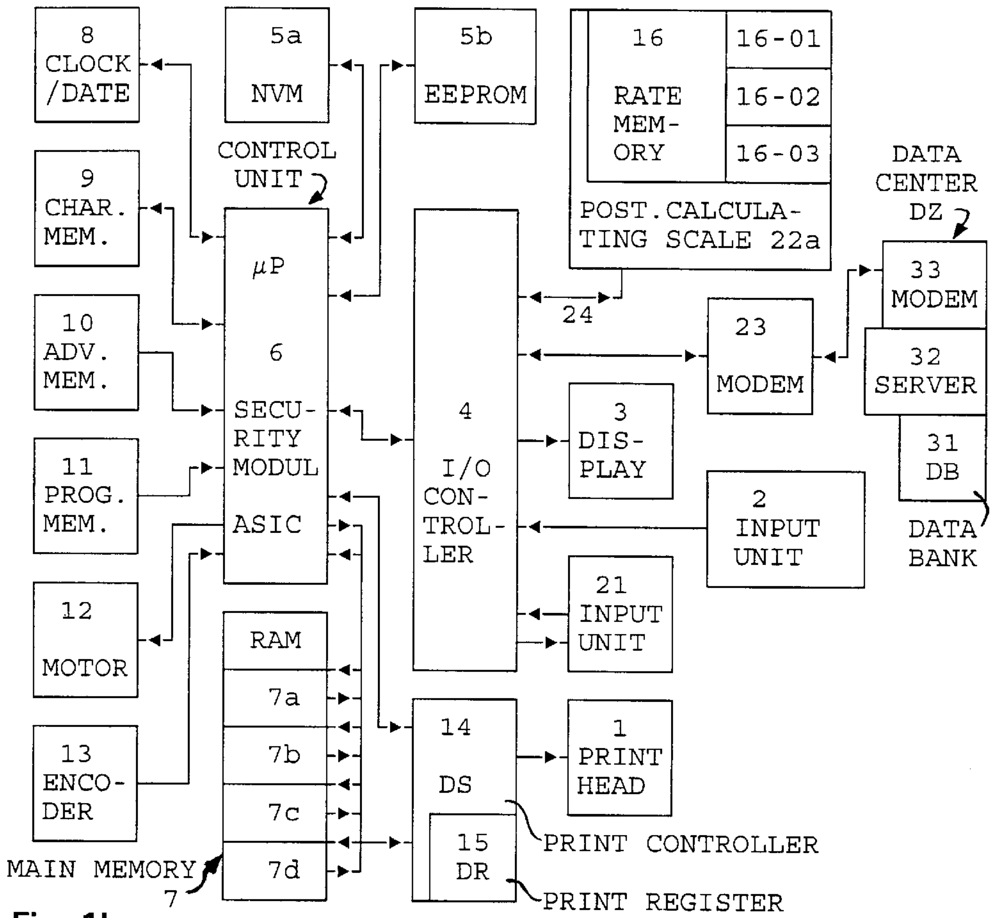
FIG. 1*b* block circuit diagram of a postage meter machine with connection to a postage calculating scale.

FIG. 1*b* shows a block circuit diagram of the electronic postage meter machine for a version with postage-calculating scale 22*a*. In the modified flowchart, which is constructed in conformity with the flowchart shown in FIG. 2, of course, the step 220 of an internal postage calculation mode in the postage meter machine is omitted.

In this embodiment, the rate memory 16 and the processor 27 are components of the postage computer of the postage-calculating scale 22*a*. The scale 22*a* has a serial interface RS 232 connected via a connecting path 24 to a serial interface (not shown) RS 232 of the input/output control module 4. The scale 22*a* can then use the modem 23 of the postage meter machine for communication with the data center.

When service data are required, particularly a modified postage rate table in an electronic postage computer, consequently, a remote loading can ensue. The mail carriers respectively commission a data center for the performance of the remote loading, i.e. to communicate service data to the terminal equipment on demand in order to be able to load the data into corresponding memories of the processing module. Given such a remote loading, a method for secure transmission of service data to a terminal equipment having the following method steps can be employed, as disclosed in German Application 198 30 055.7. After notifying a user that new service data for future use are available at the data center, a formation of request data for service data ensues at the terminal equipment before the communication of the terminal equipment with the data center. The communication includes a transmission of the request data in order to request the new service data from the data center and a reception and intermediate storage of the requested service data.

The mail processing system can include a postage meter machine and a scale such as, for example, the known scale/T1000 system of Francotyp Postalia AG & Co. In order to equip a number of postal customers with a rate table in conversion date at which the table will be effective, a loading of the table which will be valid in the future ensues in advance. In this exemplary embodiment, the postage computer is integrated into the scale 22*a*. The actuated trigger key of the scale can trigger a prior download of the table which will be valid in the future without having to update the existing, second table of the same mail carrier. A date identifying when the table takes effect must be stored allocated to each table version. The check as to whether the table is to be placed into effect continues to ensue in the postage meter machine because this already contains the clock/date module 8.

Differing from the mail processing system according to European Application 724 141, a long communication with a remote server is avoided and a conversion event does not ensue during the communication every time the machine is switched on given the inventive system. On the contrary, the actuated trigger key 45 of the scale 22*a* can trigger an on-demand loading of the table to take affect in the future before the conversion event occurs. The conversion event itself is not noticed by the user because it automatically sequences offset in time and separated from the on-demand loading on the conversion date and, thereby sequences relatively fast.

Figure 1C:
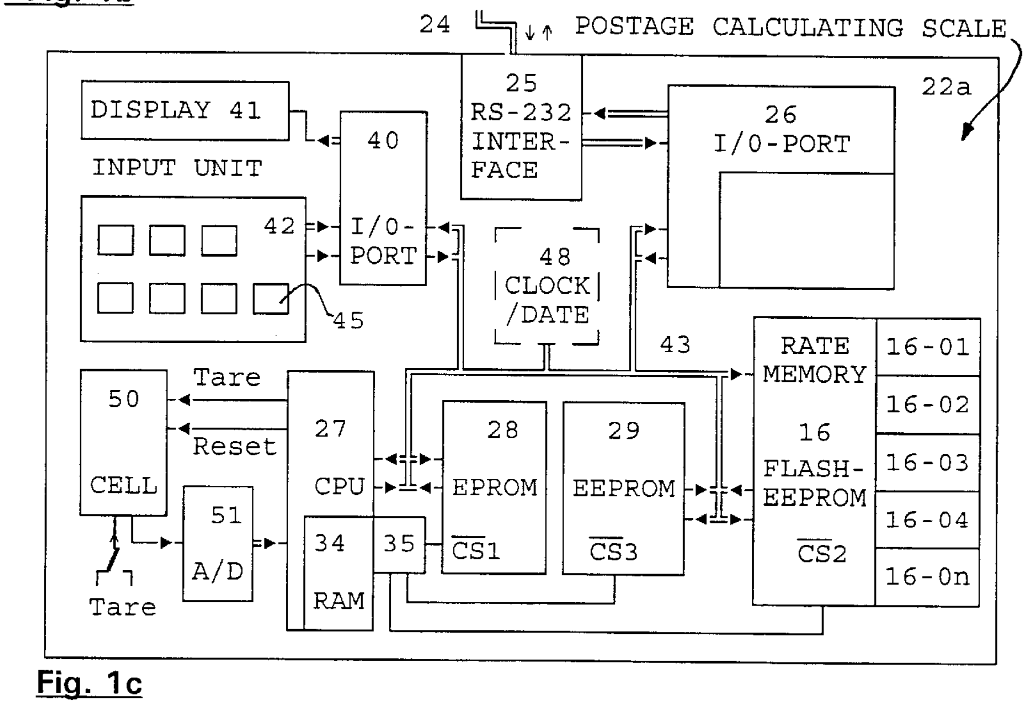
FIG. 1*c* is a block circuit diagram of a postage calculating scale which is programmable and operable, together with the postage meter machine, in accordance with the invention.

FIG. 1*c* shows a block circuit diagram of a postage computer scale that is connected to the postage meter machine of FIG. 1*b* via a serial interface. An input/output port 26 is connected to the RS232 interface 25 of the scale 22*a*, this port 26 being in communication with the internal bus 43 with the processor 27 of the scale 22*a*. Such a bus includes data, address and control lines.

The scale has an input unit 42, such as a keyboard, and an output unit 41 that are connected via an I/O port 40 to the processor 27 and also has a memory 28 connected to the processor 27 via the internal bus 43 for storing the operating software of the scale, a memory 29 for storing application data (for example, selective impression numbers), and a memory 16 for storing the loaded service data (for example, the postage fee schedule tables). A weighing cell 50 is connected via an A/D converter 51 to the processor 27 for determining the weight and, moreover, direct connections serve for resetting or calibrating the weighing cell 50 with the processor 27. More detail can be obtained from U.S. Pat. No. 5,710,706 (corresponding to European Application 724 141). Optionally, a battery-supported calendar module 48—shown with broken lines—can be integrated into the scale 22*a*, connected to the internal bus 43. All necessary inputs are undertaken via the input unit 42. Important information such as, for example, the weight of the postal item and the postage calculated with reference to the postage fee schedule table are output at the display 41.

When a modified postage fee schedule table is required in an electronic postage calculator, a remote installation can ensue on demand. To that end, the key 45 is actuated in order to trigger the loading event, and a corresponding display appears on the display 41. When the scale 22*a* is switched into the loading mode, different service data and, in particular, the postage fee schedule table that is to be entirely or partially modified can be loaded. Differing from the aforementioned, known system described in European Application 724 141, there is no coupling of the loading event with an updating, and the key 45 does not yet trigger an updating mode.

The processor 27 is programmed for checking the stored conversion date in the postage meter machine on the basis of the current date and for continuing operation with the old rate table data when the current date falls short of the conversion date and for communicating an instruction to the postage computer to update the rate table data when the current date is equal to or exceeds the conversion date. The postage computer implements a write-in of data for updating the postage fee table data in the memory provided for this purpose. The inventive method for data input into a postage computer with a loading and updating of postage fee table data in the postage computer executes the following method steps in one embodiment:

- providing at least a first memory area and a second memory area in the postage computer, the second memory area storing postage fee table data of the currently valid rate table and the first memory area is provided for postage fee table data of the new rate table which will be valid in the future beginning with the conversion date;.
- checking in the postage computer for the presence of a load instruction, and, given the presence of a load instruction, forming request data and the transmitting the request data to the data center;
- mode switching to a load mode with the selection of a free, first memory area in the memory of the postage computer;
- receiving and loading compressed, new postage fee table data and an appertaining conversion date as well as switching to the operating mode;
- automatically updating, independently of and separated in time from, the aforementioned loading, whereby postage fee schedule table data from the first memory area are decompressed and stored in the second memory area of the postage computer, with the updating can ensuing at an arbitrary, later conversion date.

The loading of new postage fee schedule table data ensues into a first area of the memory of the postage computer and the loading of an appertaining conversion date ensues into a third area 16-03 of the memory of the postage computer. The postage meter machine contains a calendar module and automatically communicates the currently valid date to the postage computer at least once, for example respectively given the initial turn-on of the postage meter machine at the start of the day. The communicated date is compared to the aforementioned conversion date in the postage computer. The automatic updating is not carried out when the current date falls short of the conversion date. The automatic updating is undertaken when the current date is beyond or equal to the conversion date.

A communication of the current date to the postage computer is preceded by the step of the postage computer automatically requesting the currently valid date from the calendar module. This ensues, for example, after the initial turn-on at the start of the day. The calendar module can be a component of the scale and/or of the postage meter machine. Data can be loaded into various devices of the system during loading. The loading of new postage fee schedule table data can ensue into a first area of the memory of the postage computer, and the loading of an appertaining conversion date can ensue into a second area of the memory of the postage meter machine.

Inventively, storage of information also ensues in a fourth memory area of the postage computer for new rate table data available in the data center, the information being, for example, a load code or a carrier-associated version number. The following steps are executed:

- providing information for new rate table data available in the data center;
- communicating of the information from the data center via the postage meter machine to the postage computer;
- storing the information in the fourth memory area 16-04 of the postage computer for such new rate table data available in the data center;
- checking in the postage computer on the basis of the stored information as to the input of an appertaining load code corresponding to information that was entered by an input unit;

mode switching onto a load mode with selection of a free, first memory area in the postage computer when the load code has a predetermined relationship to the information, and loading compressed, new rate table data associated with the information and loading an appertaining conversion date dependent on the check in the postage computer before the automatic updating.

In one embodiment, the invention provides for loading new rate table data associated with the information into a first area of a memory of the postage meter machine, with a copying into the memory of the postage computer subsequently ensuing. Loading of an appertaining conversion date, however, ensues into a second area of the memory of the postage meter machine, followed by a subsequent copying into the memory of the postage computer, whereby the existing conversion date in the second area of the memory of the postage meter machine is erased. At every first transmission of weight or postage value data from the postage computer, the stored conversion date for that carrier that was set for the postage computer is communicated to the postage meter machine.

In an embodiment with a postage computer in a scale, in accordance with the invention the postage computer in a scale undertakes a selective erasure of memory areas in the scale before the loading of compressed, new rate table data. The postage computer, at a second point in time, then implements an updating of the rate table data, possibly with a decompression of the loaded, new rate table data and with the write-in of the decompressed data, with rate table data from the first memory area being decompressed and written into the second memory area of the scale. This makes it possible for the automatic updating to ensue at an arbitrary, later conversion date independently of and separated in time from the aforementioned loading.

In one version of the invention an automatic unit forms request data for loading at a first point in time defined by the user in order to then update the loaded postage fee schedule table data when the second point in time defined by the mail carrier for new postage fee schedule table data has approached, in order to be able to access current tables. This automatic unit functions dependent on the mail carrier (carrier ID) that has been set, as well as on the version or order number or, respectively, load code and on the date supplied by the clock/date module 8 of the postage meter machine. The automatic unit is in operative connection with a microprocessor and with the input unit and can be realized in the postage computer itself and/or in the memory cells of the clock/date module 8.

The postage computer can be integrated into a postage-calculating scale 22*a* that is connected by interface to the postage meter machine. It is also possible that the system including the postage computer is a postage meter machine, however, this does not exclude the postage computer being separate from the postage meter machine and/or scale and is connected thereto by interface.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for data input into a postage computer, comprising the steps of:

providing a postage computer and a memory accessible by said postage computer;

loading new rate table data, and an associated conversion date on which the new rate table data become effective, into said memory at a user-defined, first point in time; and automatically updating said memory at a second point in time, defined dependent on said conversion date, and independent of said first point in time, to allow said postage computer to hereafter make use only of said new rate table for calculating postage.

2. A method as claimed in claim 1, wherein the step of providing a postage computer and a memory accessible by said postage computer comprises providing said memory with at least one first memory area in which said new rate table data, which will be valid in the future starting from said conversion date, are to be stored, and a second memory area in which currently valid rate table data are stored;

and wherein the step of updating comprises:

checking in said postage computer for a presence of a load instruction and, if a load instruction is present, forming request data requesting said new rate table data and transmitting said request data to a data center remote from said postage computer;

switching in said postage computer to a load mode including selection of an available first memory area in said memory;

receiving said new postage fee table data and said conversion date at said postage computer from said data center and, in said load mode, loading said new rate table data into the selected first memory area, and thereafter switching in said postage computer to an operating mode; and automatically updating said memory independently of and separated in time from said load mode, by transferring said new rate table data in said first memory area into said second memory area on said conversion date.

3. A method as claimed in claim 2 comprising the additional steps of compressing said new rate table data before loading said new rate table data into said selected first memory area, and decompressing said new rate table data upon transfer of said new rate table data into said second memory area.

4. A method as claimed in claim 2 wherein the step of providing a postage computer and a memory accessible by said postage computer comprises providing said memory with a third memory area, and wherein the step of loading said new rate table data comprises loading said conversion date, into said third memory area, and wherein the step of automatically updating said memory comprises providing an electronic calendar module which continuously emits a signal to said postage computer identifying a current date, and periodically determining in said postage computer whether said current date precedes, equals or follows said conversion date and automatically updating said memory if said current date equals or follows said conversion date and continuing operation using said rate table data currently stored in said second memory area if said current date precedes said conversion date.

5. A method as claimed in claim 1 wherein the step of providing a postage computer and a memory accessible by said postage computer comprises providing said memory with a first memory area and a further memory area, separate from said first memory area, and wherein the step of loading said new rate table data and said conversion date comprise loading said new rate table data into said first memory and loading said conversion date into said further memory area.

6. A method as claimed in claim 1, wherein the step of providing a postage computer and a memory accessible by said postage computer comprises providing said memory with a designated memory area;

and wherein said method comprises the additional steps of:

communicating, from a data center remote from said postage computer, information about said new rate table data available at said data center and making an entry in said designated memory area dependent on said information;

generating a load code in said postage computer and checking if and when said load code has a predetermined relationship to said entry in said designated memory area; and switching to said load mode and loading said new rate table data into said memory if and when said predetermined relationship exists.

7. A method as claimed in claim 1 comprising the additional step of:

providing a postage meter machine containing said postage calculator and said memory, and dividing said memory into a postage meter machine memory and a postage computer memory;

wherein the step of loading said new rate table data and said conversion date in said memory comprises loading said new rate table data and said conversion date into said postage meter machine memory;

wherein the step of updating said memory comprises updating said postage computer memory by copying said new rate table data and said conversion date from said postage meter machine memory into said postage computer memory and erasing said conversion date from said postage meter machine; and wherein said method comprises the additional step of, upon turning on said postage meter machine and said postage computer, said postage computer generating a first transmission after turn on from said postage computer to said postage meter machine and informing said postage meter machine in said first transmission of the conversion date stored in said postage computer memory.

8. A method as claimed in claim 1 comprising disposing said postage computer and said memory in a scale which weighs postal items and which supplies a signal indicating a weight of a weighed postal item to said postage computer.

9. An arrangement for data input, comprising:

a postage computer;

a memory accessible by said postage computer said memory containing currently valid rate table data for use by said postage computer;

an input unit for entering and storing a load requirement into said computer;

said computer detecting a presence of a stored load requirement and automatically causing new rate table data to be entered into said memory upon detecting said stored load requirement and for simultaneously entering a conversion requirement when loading said new rate table data; and said computer periodically checking said conversion requirement and if and when said conversion requirement satisfies a predetermined condition, automatically updating said memory to thereafter employ only said new rate table data in place of said currently valid rate table data, and said postage computer otherwise operating using said currently valid rate table data, said postage computer updating said memory at a time which is independent of and separated in time from loading of said new rate table data.

10. An arrangement as claimed in claim 9 further comprising a calendar module which emits a signal representing a current date, and wherein said conversion requirement is an effective date, and wherein said computer updates said memory dependent on a relationship between said current date and said effective date.

11. An arrangement as claimed in claim 9 wherein said memory comprises a plurality of memory areas, including a city name representation memory area wherein a plurality of different representations of respective cities are stored and a load requirement memory area wherein a loading date is stored;

a calendar module which emits a signal representing a current date, said signal being supplied to said postage computer;

said postage computer checking said loading date relative to said current date and switching to a loading mode for loading said new rate table data if said current date equals or follows said loading date and switching to an operating mode using said currently valid rate table data if said current date precedes said loading date; and wherein said conversion requirement includes a conversion date, and said computer periodically comparing said current date to said conversion date and updating said memory if said current date equals or is after said conversion date, and otherwise operating using said currently valid rate table data.

12. An arrangement as claimed in claim 9 further comprising a scale containing said postage computer.

13. An arrangement as claimed in claim 9 further comprising a postage meter machine containing said postage computer.

14. An arrangement as claimed in claim 9 further comprising postage meter machine, and wherein said postage computer is connected to said postage meter machine via an interface.

15. An arrangement as claimed in claim 9 further comprising a scale, and wherein said postage computer is connected to said scale via an interface.

* * * * *